(12) United States Patent  (10) Patent No.: US 9,952,694 B2
Kim  (45) Date of Patent: Apr. 24, 2018

(54) DISPLAY DEVICE INTEGRATED WITH TOUCH SCREEN

(71) Applicant: LG Display Co., Ltd., Seoul (KR)

(72) Inventor: Tae Hwan Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/065,693

(22) Filed: Oct. 29, 2013

(65) Prior Publication Data

US 2014/0132534 A1 May 15, 2014

(30) Foreign Application Priority Data

Nov. 13, 2012 (KR) .................... 10-2012-0127962

(51) Int. Cl.
*G06F 3/041* (2006.01)

(52) U.S. Cl.
CPC .......... *G06F 3/0412* (2013.01); *G06F 3/0416* (2013.01)

(58) Field of Classification Search
CPC ............................. G06F 3/0412; G06F 3/0416
See application file for complete search history.

(56) References Cited

U.S. PATENT DOCUMENTS

| 2008/0001876 | A1* | 1/2008 | Ito et al. | ........................ 345/87 |
| 2008/0062148 | A1* | 3/2008 | Hotelling et al. | ............ 345/174 |
| 2008/0278451 | A1 | 11/2008 | Lee | |
| 2010/0110038 | A1 | 5/2010 | Mo et al. | |
| 2010/0144391 | A1* | 6/2010 | Chang et al. | .................. 455/566 |
| 2010/0193257 | A1* | 8/2010 | Hotelling et al. | .......... 178/18.06 |
| 2010/0194695 | A1* | 8/2010 | Hotelling et al. | ............. 345/173 |
| 2010/0194698 | A1* | 8/2010 | Hotelling et al. | ............. 345/173 |
| 2010/0194707 | A1* | 8/2010 | Hotelling et al. | ............. 345/173 |
| 2010/0253638 | A1* | 10/2010 | Yousefpor et al. | ............ 345/173 |
| 2010/0258360 | A1* | 10/2010 | Yilmaz | ....................... 178/18.06 |
| 2013/0147724 | A1* | 6/2013 | Hwang et al. | ................. 345/173 |
| 2015/0192815 | A1 | 7/2015 | Chang et al. | |

FOREIGN PATENT DOCUMENTS

| CN | 102439548 A | 5/2012 |
| CN | 102540530 A | 7/2012 |

OTHER PUBLICATIONS

German Office Action issued in German Patent Application No. 10 2013 112 486.0 dated Jan. 25, 2016.
Chinese Office Action issued in Chinese Patent Application No. 201310571435.7 dated Dec. 3, 2015.

* cited by examiner

*Primary Examiner* — William Boddie
*Assistant Examiner* — Andrew Schnirel
(74) *Attorney, Agent, or Firm* — Morgan, Lewis & Bockius LLP

(57) ABSTRACT

Disclosed is a display device integrated with touch screen. The display device has a reduced bezel and an enhanced aesthetic design. Left and right bezels of a panel are reduced, thus increasing an aesthetic design. A driving circuit that generates the touch driving signal is built into the panel, thus decreasing the size of the touch IC and the manufacturing cost.

20 Claims, 10 Drawing Sheets

DISPLAY DEVICE INTEGRATED WITH TOUCH SCREEN

CROSS-REFERENCE TO RELATED APPLICATIONS

This application claims the benefit of the Korean Patent Application No. 10-2012-0127962 filed on Nov. 13, 2012, which is hereby incorporated by reference as if fully set forth herein.

BACKGROUND

Field of the Invention

The present invention relates to a display device integrated with touch screen.

Discussion of the Related Art

Instead of an input device such as a mouse or a keyboard which is conventionally applied to LCD devices, a touch screen that enables a user to directly input information with a finger or a pen is applied as an input device to LCD devices. The touch screen can be easily manipulated by all users, and thus, the application of the touch screen is being expanded.

A touch screen is applied to field emission displays (FEDs), plasma display panel (PDPs), electroluminescent displays (ELDs), and electrophoretic display (EPDs), in addition to liquid crystal display (LCD) devices. Recently, in applying the touch screen to LCD devices, the LCD devices are developed in a type where the touch screen is built in a liquid crystal panel for slimming.

Display devices with an integrated touch screen are categorized into an optical type, a resistive type, a capacitive type, etc. according to a sensing type. Recently, the capacitive type is mainly used for increasing the sharpness of a screen and the accuracy of touch.

FIG. 1 illustrates a related art display device integrated with touch screen, and is a diagram for describing a problem that a touch driving line is routed in an inactive area of a liquid crystal panel, and thus, left and right bezel widths increase.

Referring to FIG. 1, the related art display device integrated with touch screen includes a liquid crystal panel, which includes an active area 10 displaying an image and an inactive area 20, and a driving circuit unit that drives the liquid crystal panel.

A data driver IC 30 is disposed at a lower end of the inactive area 20, and a timing controller 70 is disposed at a printed circuit board (PCB) 50. The data driver IC 30 and the timing controller 70 may be connected to a flexible printed circuit (FPC) 40.

Moreover, a touch driver 60 for a touch sensing driving is disposed at the PCB 50. A touch driving line 80 is vertically routed at each of left and right side surfaces of the liquid crystal panel, and the touch driving line 80 and a touch driver 60 may be connected to the FPC 40.

In the related art display device integrated with touch screen, a plurality of common electrodes formed at a lower substrate (a thin film transistor (TFT) array substrate) are used for display, and moreover used as a touch electrode. In this case, the plurality of common electrodes formed on the same layer are divided into a plurality of touch blocks, which perform a function of a touch driving electrode (a TX electrode) or a function of a touch sensing electrode (a RX electrode).

In order to detect a touched position, the touch driving electrode is connected in an X-axis direction through the touch driving line 80. The touch sensing electrode among the plurality of touch blocks is connected in a Y-axis direction through the touch sensing line 90.

A plurality of the touch driving electrodes are separated from each other for avoiding a contact with a plurality of the touch sensing electrodes, and the plurality of touch driving electrodes do not contact the plurality of touch sensing electrodes.

In the related art display device integrated with touch screen, the touch driving electrode is connected in the X-axis direction, and the touch driving line 80 with a touch driving signal applied thereto is routed in a vertical direction outside the active area 10.

Here, left and right widths of the inactive area 20 increase due to a line width of the touch driving line 80 and an interval between lines, and due to this, left and right bezel widths of the LCD device increase.

Research for reducing a bezel width is being recently done for increasing a degree of immersion in a screen and an aesthetic design, but since the touch driving line 80 is routed in the inactive area, there is a limitation in reducing a bezel width.

SUMMARY

Accordingly, the present invention is directed to provide a display device integrated with touch screen that substantially obviates one or more problems due to limitations and disadvantages of the related art.

An aspect of the present invention is directed to provide a display device integrated with touch screen in which left and right bezels are reduced, thus increasing an aesthetic design.

Another aspect of the present invention is directed to provide a display device integrated with touch screen in which a lower bezel is reduced, thus increasing an aesthetic design.

Another aspect of the present invention is directed to provide a display device integrated with touch screen in which a size of a touch integrated circuit (IC) and the manufacturing cost are reduced.

Another aspect of the present invention is directed to provide a display device integrated with touch screen which has an enhanced touch sensing performance without a reduction in display quality of an image.

In addition to the aforesaid objects of the present invention, other features and advantages of the present invention will be described below, but will be clearly understood by those skilled in the art from descriptions below.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device integrated with touch screen including: a touch screen configured to include a plurality of touch driving electrodes, which each include a plurality of sub driving electrodes that are electrically connected to each other in an inactive area of a panel to configure one touch driving electrode and are formed in parallel and in a gate line direction of the panel, and a plurality of touch sensing electrodes that are each disposed between a plurality of adjacent sub driving electrodes and are formed in parallel and in a data line direction of the panel; a touch signal driver provided in an upper inactive area of the panel, and configured to supply a touch driving signal or a common voltage to the plurality of touch driving electrodes according to a driving mode of the panel; a display driver IC provided in an outside or lower inactive area of the panel, and configured to receive a plurality of touch sensing signals from the plurality of touch sensing electrodes and generate the common voltage to supply the common voltage to a transferor of the touch signal driver and the plurality of touch sensing electrodes; and a touch sensing unit configured to determine whether there is a touch, on a basis of the plurality of touch sensing signals.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Hereinafter, a display device integrated with touch screen and a driving method thereof according to embodiments of the present invention will be described in detail with reference to the accompanying drawings.

In description of embodiments of the present invention, when a structure (for example, an electrode, a line, a wiring, a layer, or a contact) is described as being formed at an upper portion/lower portion of another structure or on/under the other structure, this description should be construed as including a case where the structures contact each other and moreover a case where a third structure is disposed therebetween.

LCD devices have been variously developed in a twisted nematic (TN) mode, a vertical alignment (VA) mode, an in-plane switching (IPS) mode, and a fringe field switching (FFS) mode according to a scheme of adjusting the alignment of liquid crystal.

Among the modes, the TN mode and the VA mode are modes in which a plurality of pixel electrodes are arranged in a lower substrate, and a plurality of common electrodes are arranged on an upper substrate (color filter array substrate), thereby adjusting the alignment of liquid crystal with vertical electric fields.

The IPS mode and the FFS mode are modes in which a plurality of pixel electrodes and a common electrode are arranged on a lower substrate, thereby adjusting the alignment of liquid crystal with electric fields between the pixel electrodes and the common electrode.

The IPS mode is a mode in which the pixel electrodes and the common electrodes are alternately arranged in parallel, and thus, lateral electric fields are respectively generated between the pixel electrodes and the common electrodes, thereby adjusting the alignment of the liquid crystal. In the IPS mode, the alignment of the liquid crystal is not adjusted at an upper side portion of each of the pixel electrodes and common electrodes, and thus, light transmittance is reduced in a corresponding area.

The FFS mode has been developed for overcoming the limitations of the IPS mode. In the IPS mode, the pixel electrode and the common electrode is provided in plurality to be separated from each other with an insulating layer therebetween.

In this case, the FFS mode is a mode in which one electrodes of the pixel electrodes and common electrodes are provided in a plate shape or a pattern, and the other electrodes are provided in a finger shape, thereby adjusting the alignment of liquid crystal with fringe fields generated between the pixel electrodes and common electrodes.

An LCD device according to an embodiment of the present invention may be applied with no limitation of a mode, and in a below detailed description, the FFS mode may be applied as an example.

Figure 1:
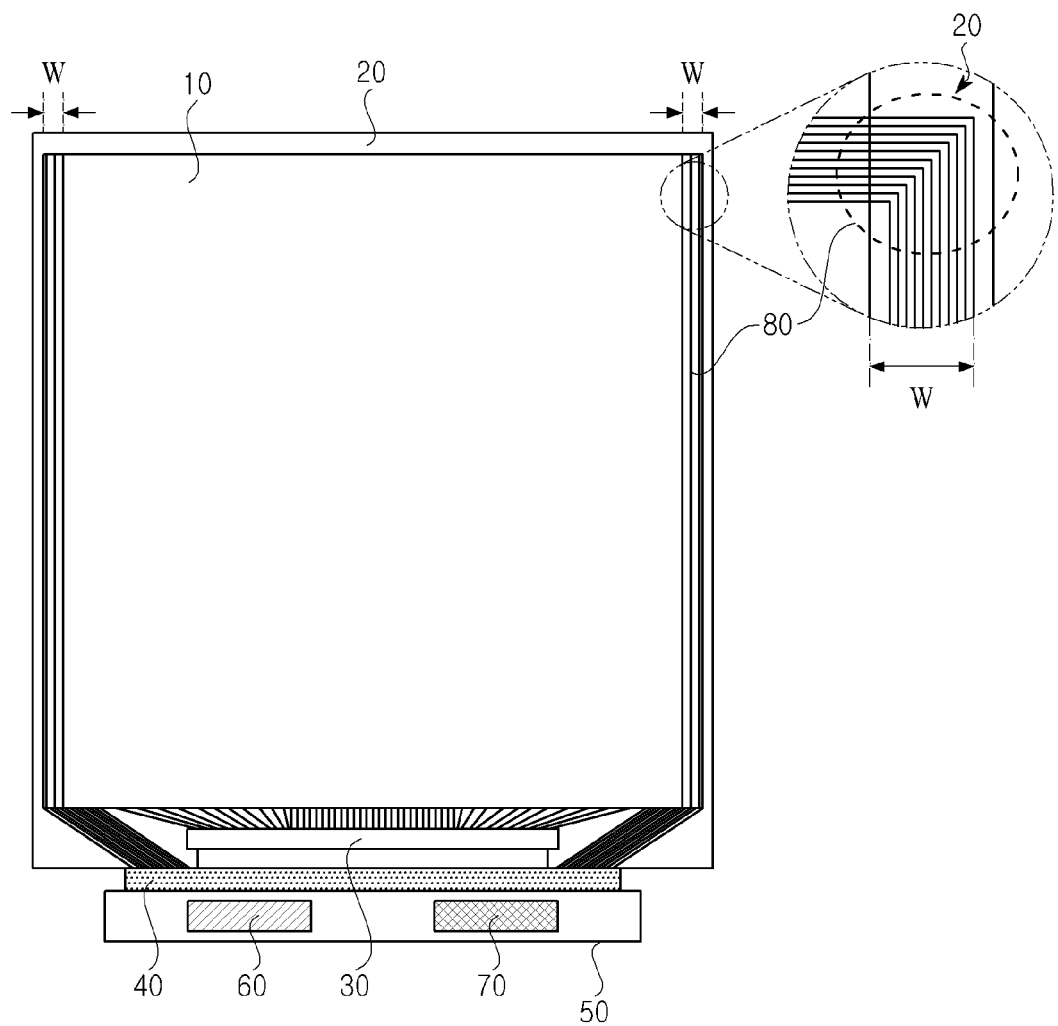
FIG. 1 illustrates a related art display device integrated with touch screen, and is a diagram for describing a problem that a touch driving line is routed in an inactive area of a liquid crystal panel, and thus, left and right bezel widths increase.
Figure 2:
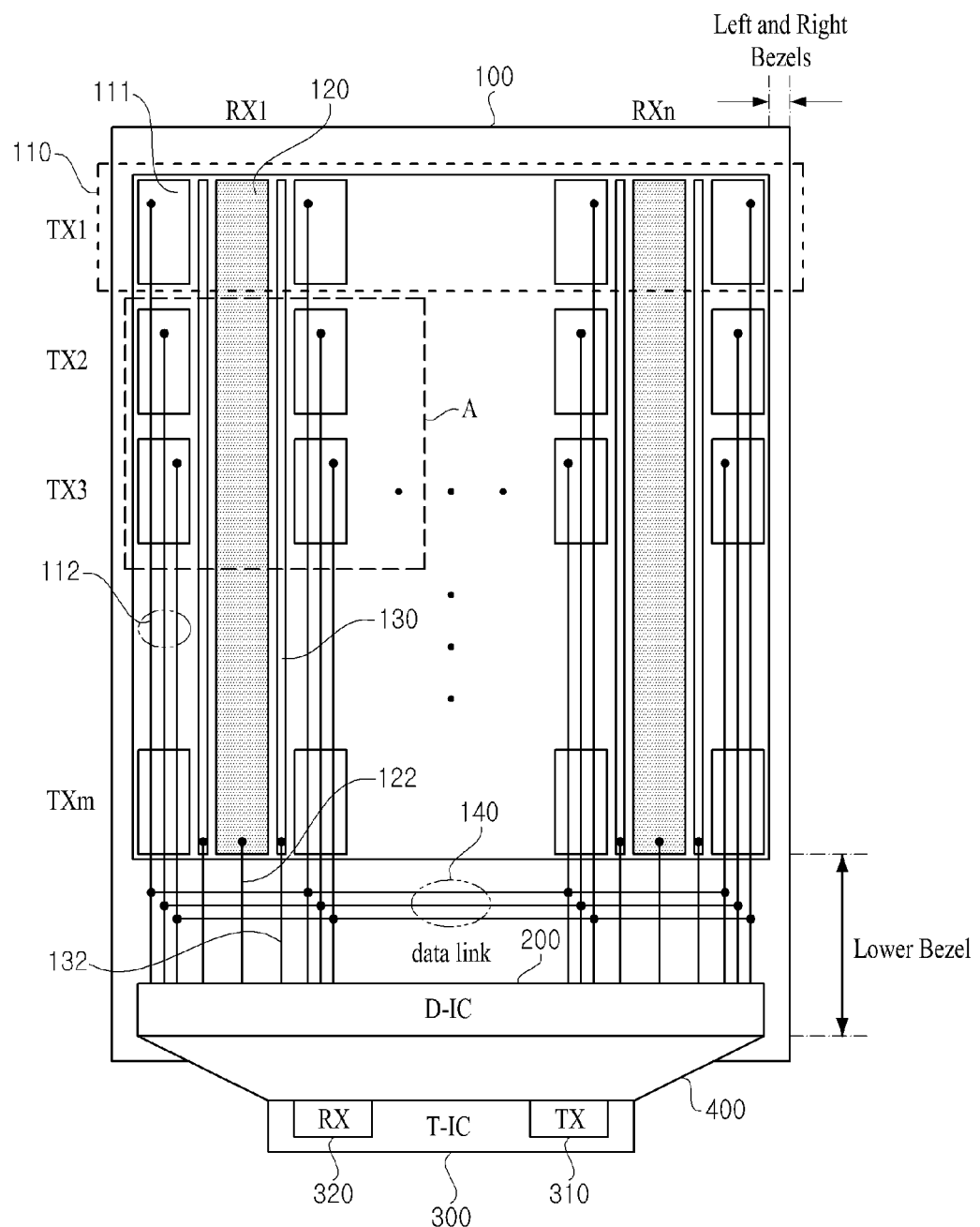
FIG. 2 is a diagram schematically illustrating a display device integrated with touch screen according to a first embodiment of the present invention.
Figure 3:
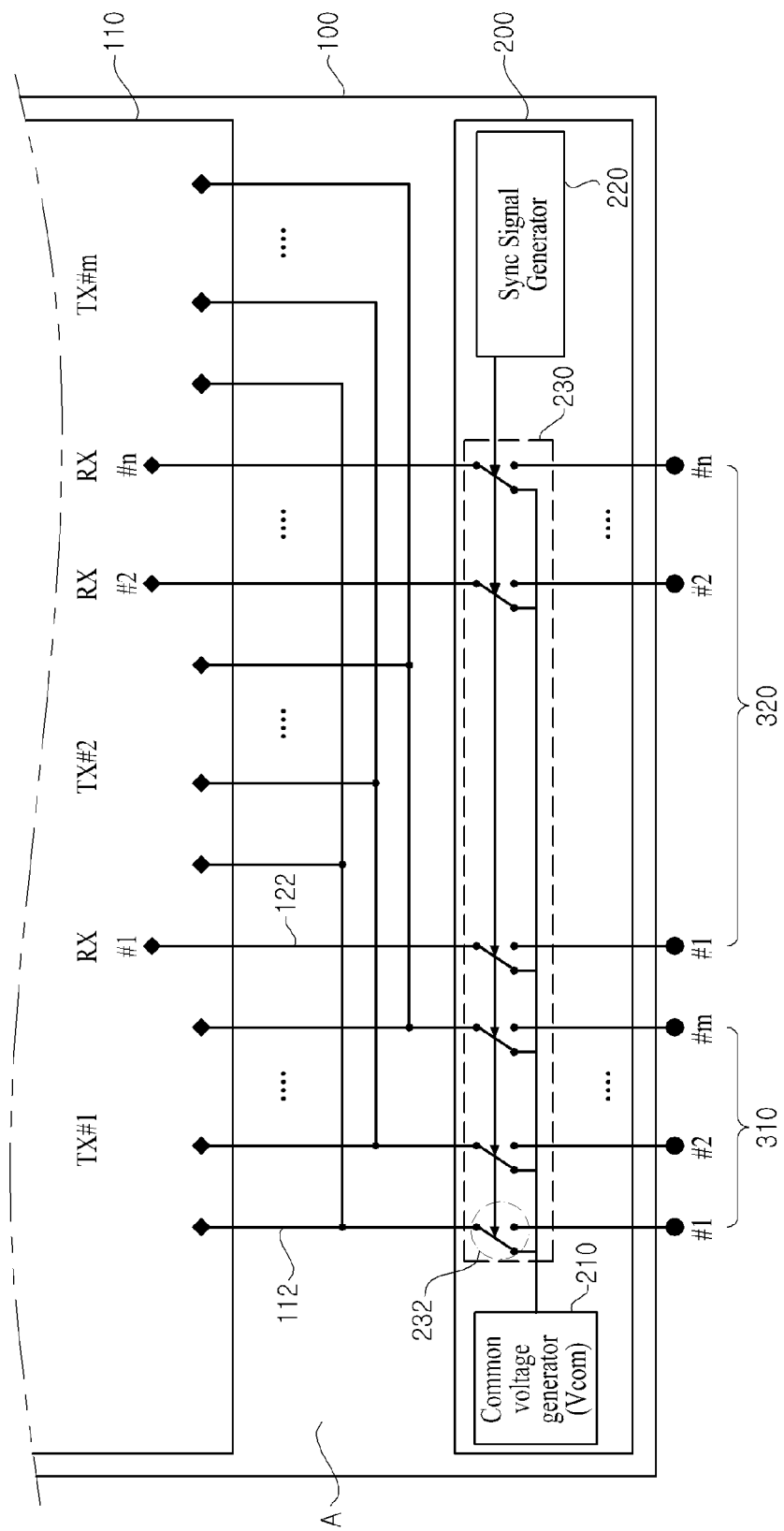
FIG. 3 is a diagram schematically illustrating a configuration of a display driver IC according to a first embodiment of the present invention.

FIG. 2 is a diagram schematically illustrating a display device integrated with touch screen according to a first embodiment of the present invention, and FIG. 3 is a diagram schematically illustrating a configuration of a display driver IC according to a first embodiment of the present invention.

Referring to FIGS. 2 and 3, the display device integrated with touch screen according to a first embodiment of the present invention includes a touch screen panel 100 with a built-in touch screen, a backlight unit, and a driving circuit unit. In FIG. 2, the backlight unit is not illustrated.

The touch screen panel 100 includes an upper substrate, a lower substrate, and a liquid crystal layer formed therebetween.

A plurality of red, green, and blue color filters for displaying a full color image are formed at an upper substrate of a touch screen panel 100. A black matrix for differentiating adjacent pixels is formed between adjacent color filters.

A plurality of pixels are formed in a matrix type at a lower substrate of the touch screen panel 100, and the plurality of pixels are defined by intersections between a plurality of data lines and a plurality of gate lines. A thin film transistor (TFT) and a storage capacitor are formed in each of a plurality of defined by intersections between the plurality of data lines and the plurality of gate lines.

The touch screen panel 100 cannot self-emit light, and thus displays an image by using light supplied from a backlight unit (not shown). The backlight unit includes a plurality of backlights (for example, light emitting diodes (LEDs) or cold cathode fluorescent lamps (CCFLs)) and an optical member (a light guide plate or a diffusive plate and a plurality of optical sheets) for enhancing an efficiency of light.

The touch screen panel 100 includes an active area and an inactive area, and the plurality of pixels for displaying an image are in a matrix type in the active area. A plurality of common electrodes respectively formed at the plurality of pixels are divided into a plurality of touch driving electrodes 110 and a plurality of touch sensing electrodes 120. A touch screen is configured with the plurality of touch driving electrodes 110 and the plurality of touch sensing electrodes 120, and detects a user's touch.

Here, when the display device integrated with touch screen is driven in a display mode, the plurality of touch driving electrodes 110 and the plurality of touch sensing electrodes 120 are driven as the common electrodes.

When the display device integrated with touch screen is driven in a touch mode, the plurality of touch driving electrodes 110 are driven as TX electrodes of a touch screen, and the plurality of touch sensing electrodes 120 are driven as RX electrodes of the touch screen, thereby sensing a user's touch. That is, the touch screen panel 100 uses the common electrodes for display, and moreover drives the common electrodes as touch electrodes.

The plurality of touch driving electrodes 110 may be configured with first to mth touch driving electrodes TX1 to TXm, and each of the touch driving electrodes 110 may be configured with n+1 number of sub driving electrodes 111. Also, the plurality of touch sensing electrodes 120 may be configured with first to nth touch sensing electrodes RX1 to RXn.

Dummy electrodes 130 are respectively formed at the left and right of each of the plurality of touch sensing electrodes 120. The dummy electrodes 130 are for reducing a touch sensing noise and solving a problem that liquid crystal between adjacent touch driving electrode 110 and touch sensing electrode 120 is abnormally aligned, in displaying an image.

A dummy electrode line 132 is connected to each dummy electrode 130, and a common voltage (Vcom) or a voltage, having the same level as that of a reference voltage applied to a corresponding touch sensing electrode 120, is supplied to each dummy electrode 130 through a corresponding dummy line 132. A detailed description on this will be made below with reference to FIG. 5.

Each of the plurality of touch driving electrodes 110 includes a plurality of sub driving electrodes 111 due to an electrical connection in the inactive area. Here, the inactive area may be an upper end portion or lower end portion of the touch screen panel 100 which is an area in which the display driver 200. In FIG. 2, as an example, the display driver integrated circuit (IC) 200 is illustrated as being formed in the lower end portion of the touch screen panel 100.

For example, in order for the plurality of sub driving electrodes 111 to configure one touch driving electrode, a plurality of driving electrode lines 112 may be electrically connected through a corresponding common line 140 in the inactive area outside the display driver IC 200.

That is, the driving electrode lines 112 of the respective sub driving electrodes 111 configuring one touch driving electrode 110 are electrically connected to each other in the inactive area of the touch screen panel 100.

The same touch driving signal should be supplied to the plurality of sub driving electrodes 111 configuring one touch driving electrode 110, and thus, the driving electrode lines 112 of the respective sub driving electrodes 111 configuring one touch driving electrode 110 are electrically connected to each other through a corresponding common line 140.

However, the present invention is not limited thereto, and as another example, the driving electrode lines 112 of the respective sub driving electrodes 111 configuring one touch driving electrode 110 are electrically connected to each other inside the display driver IC 200.

In other words, as illustrated in FIG. 2, in the display device integrated with touch screen according to various embodiments of the present invention, the plurality of driving electrode lines 112 may be electrically connected to each other in the inactive area outside the display driver IC 200, and then may be connected directly to the display driver 200. Although not shown, as another example of the present invention, the plurality of driving electrode lines 112 may be electrically connected to each other in the inactive area outside the display driver IC 200, and then may be connected to a touch IC 300 via a flexible printed circuit (FPC) 400.

Therefore, in the display device integrated with touch screen according to various embodiments of the present invention, a plurality of sub driving electrodes are electrically connected to each other not inside the touch screen panel 100 but in the inactive area of the touch screen panel 100 to configure one touch driving electrode, thus increasing an aperture ratio.

The plurality of touch driving electrodes 110 are formed in parallel and in a width direction that is a gate line (not shown) direction of the touch screen panel 100. Each of the plurality of touch sensing electrodes 120 is disposed a plurality of adjacent sub driving electrodes 111. The plurality of touch sensing electrodes 120 are formed as a stripe type in parallel and in a height direction that is a data line (not shown) direction.

Therefore, the display device integrated with touch screen according to various embodiments of the present invention, the driving electrode lines 112 of each touch driving electrode are not connected to a left side and right side of the touch screen panel 100, and the driving electrode line 112 extending from each of the plurality of sub driving electrodes 111 extends to the upper end portion or lower end portion of the touch screen panel 100 that is an area with the display driver IC 200 disposed therein, thus decreasing left and right bezel widths of the touch screen panel 100.

Each of the plurality of touch driving electrodes 110 may be configured with a plurality of block-type common electrodes that are formed to overlap a plurality of unit pixel areas. Each of the plurality of touch sensing electrodes 120 may be configured with one block-type common electrode that is formed to overlap the plurality of unit pixel areas.

The plurality of touch driving electrodes 110 and the plurality of touch sensing electrodes 120 should function as common electrodes for driving liquid crystal, and thus may be formed of a transparent material such as indium tin oxide (ITO).

Referring to FIG. 3, when a driving mode of the touch screen panel 100 is the display mode, the display driver IC 200 applies the common voltage to the touch screen (i.e., the touch driving electrodes 110 and the touch sensing electrodes 120).

When the driving mode of the touch screen panel 100 is the touch mode, the display driver IC 200 supplies a touch driving signal (a TX signal) and receives a touch sensing signal.

To this end, the display driver IC 200 may include a common voltage generator 210, a sync signal generator 220, and a switching unit 230.

The display driver IC 200 may further include a gate driver that applies a scan signal to a plurality of gate lines, a data driver that respectively applies image data signals to a plurality of data lines, and a controller that controls the elements. Such elements are general elements included in the display driver IC 200, and their detailed descriptions are not provided.

The common voltage generator 210 generates the common voltage to be applied to the plurality of touch driving electrodes 110 or the plurality of touch sensing electrodes 120 which are included in the touch screen.

In other words, the plurality of touch driving electrodes 110 and the plurality of touch sensing electrodes 120 according to various embodiments of the present invention should perform a function of the common electrode. Therefore, the common voltage generator 210 generates the common voltage used to drive liquid crystal when the touch screen panel 100 operates in a display driving mode (the display mode), and supplies the generated common voltage to the plurality of touch driving electrodes 110 and the plurality of touch sensing electrodes 120.

The switching unit 230 connects the plurality of touch driving electrodes 110 and the plurality of touch sensing electrodes 120 to the common voltage generator 210 (or the touch IC 300 (a touch driver)) according to a sync signal indicating the driving mode.

For example, when a first sync signal indicating the display driving mode is input to the switching unit 230, the switching unit 230 connects the plurality of touch driving electrodes 110 and the plurality of touch sensing electrodes 120 to the common voltage generator 210.

Therefore, the common voltage generated by the common voltage generator 210 is applied to the plurality of touch driving electrodes 110 through the respective driving electrode lines 112. Also, the common voltage is applied to the plurality of touch sensing electrodes 120 through the respective sensing electrode lines 122.

When a second sync signal indicating a touch driving mode (the touch mode) is input to the switching unit 230, the switching unit 230 connects the plurality of touch driving electrodes 110 and the plurality of touch sensing electrodes 120 to the touch IC 300.

Therefore, the touch driving signal is applied to the plurality of touch driving electrodes 110 through the respective driving electrode lines 112. Also, the touch driving signal is applied to the plurality of touch sensing electrodes 120 through the respective sensing electrode lines 122.

A related art display driver IC applies the common voltage to a touch IC, which should include a switching function for applying the common voltage, applied from the related art display driver IC, to a plurality of touch driving electrodes and a plurality of touch sensing electrodes. Also, when the common voltage is a negative voltage, the manufacturing process and design of the existing touch IC should be changed for accommodating the negative voltage.

To solve such a problem, the present invention builds a common voltage switching function into the display driver IC 200, and thus solves the problem, and can reduce the manufacturing cost by using the existing touch IC without manufacturing a separate touch IC.

Here, the switching unit 230 includes a plurality of switches 232 that are connected to the plurality of touch driving electrodes 110 and the plurality of touch sensing electrodes 120, and the plurality of switches 232 may be connected to the respective touch driving electrodes 110 and the respective touch sensing electrodes 120.

For example, the number of switches included in the switching unit 230 may correspond to the total number of touch driving electrodes 110 and the total number of touch sensing electrodes 120.

Each of the plurality of sensing electrode lines 122 connected to the plurality of touch sensing electrodes 120 may be separately connected to one switch 232 of the switching unit 230.

Therefore, in the present invention, the plurality of touch driving electrodes 110 and the plurality of touch sensing electrodes 120 are separately connected to the respective switches 232 corresponding to the number of touch driving electrodes and the number of touch sensing electrodes.

The sync signal generator 220, as described above, generates the sync signal indicating the driving mode of the touch screen panel 100.

For example, during an image output period in which the touch screen panel 100 operates in the display driving mode, the sync signal generator 220 generates a first sync signal that allows the plurality of touch driving electrodes 110 and the plurality of touch sensing electrodes 120 to be connected to the common voltage generator 210, and supplies the first sync signal to the switching unit 230.

During a touch sensing period in which the touch screen panel 100 operates in the touch driving mode, the sync signal generator 220 generates a second sync signal that allows the plurality of touch driving electrodes 110 and the plurality of touch sensing electrodes 120 to be connected to the touch IC 300, and supplies the second sync signal to the switching unit 230.

In other words, during the image output period, the sync signal generator 220 outputs the first sync signal to the switching unit 230 to connect the plurality of touch driving electrodes 110 and the plurality of touch sensing electrodes 120 to the common voltage generator 210. At this time, the common voltage is applied to the plurality of touch driving electrodes 110 and the plurality of touch sensing electrodes 120, and thus, the plurality of touch driving electrodes 110 and the plurality of touch sensing electrodes 120 perform the function of the common electrode.

Moreover, during the touch sensing period, the sync signal generator 220 outputs the second sync signal to the switching unit 230 to connect the plurality of touch driving electrodes 110 and the plurality of touch sensing electrodes 120 to the touch IC 300.

The sync signal generator 220 may be used as a controller of the display driver IC 200, and may generate and output the above-described sync signals according to control by the controller of the display driver IC 200.

Moreover, the sync signal generator 220 may transfer the above-described sync signals to the touch IC 300 to control an operation of the touch IC 300.

In the display device integrated with touch screen according to various embodiments of the present invention, the sync signal generator 220 included in the display driver IC 200 is described as generating the sync signal, but in another embodiment, the sync signal may be input from the outside of the display driver IC 200.

The touch IC 300 includes a transferor (TX) 310, which generates the touch driving signal and supplies the touch driving signal to the touch driving electrodes 110, and a receiver (RX) 320 that senses a capacitance of each of the touch sensing electrodes 120.

The touch IC 300 generates the touch driving signal to apply the touch driving signal to the display driver IC 200, and receives a touch sensing signal from the display driver IC 200 to detect a touch and a touched position in the active area of the touch screen panel 100.

Here, as illustrated in FIG. 2, the touch IC 300 may be connected to the display driver IC 200 through the FPC 400. Although not shown, in another embodiment, the touch IC 300 may be provided in the display driver IC 200.

Moreover, the plurality of switches 232 connected to the plurality of driving electrode lines 112 in the display driver IC 200 may be connected to the transferor 310 of the touch IC 300, and the plurality of switches 232 connected to the plurality of sensing electrode lines 122 may be connected to the receiver 320 of the touch IC 300.

Therefore, when the switching unit 230 is turned on by the second sync signal, a driving voltage generated in the transferor 310 of the touch IC 300 is applied to the plurality of touch driving electrodes 110 through the plurality of driving electrode lines 112 connected the plurality of switches 232.

A plurality of touch sensing signals, which are generated in the plurality of touch sensing electrodes 120 by the driving voltage applied to the plurality of touch driving electrodes 110, are applied to the receiver 320 of the touch IC 300 through the plurality of sensing electrode lines 122 connected to the plurality of switches 232.

In FIG. 2, it has been described above that the driving electrode line 112 connecting the plurality of sub driving electrodes 111 to one touch driving electrode 110 is connected to the other driving electrode lines 112 through the common line 140 in the inactive area of the touch screen panel 100.

As another example, it has been described above that the plurality of sub driving electrodes 111 and the plurality of driving electrode lines 112 are electrically connected to each other in the display driver IC 200.

The driving electrode line 112, the sensing electrode line 122, the dummy electrode line 132 connected to the dummy electrode 130, and the common line 140 which are formed in the inactive area may be formed as a single link or a dual link.

When the lines are formed as the single link, it is difficult to secure a sufficient line width, and due to this, the lines are recently formed as the dual link. Here, due to the common line 140 which is formed in a width direction of the touch screen panel 100, a width of a lower bezel can increase by a width of the common line 140.

That is, left and right bezels of the touch screen panel 100 can be considerably reduced by using the common line 140, but the lower bezel can increase by the width of the common line 140. To overcome such a limitation, a display device integrated with touch screen according to a second embodiment of the present invention illustrated in FIGS. 4 and 5 is proposed.

Figure 4:
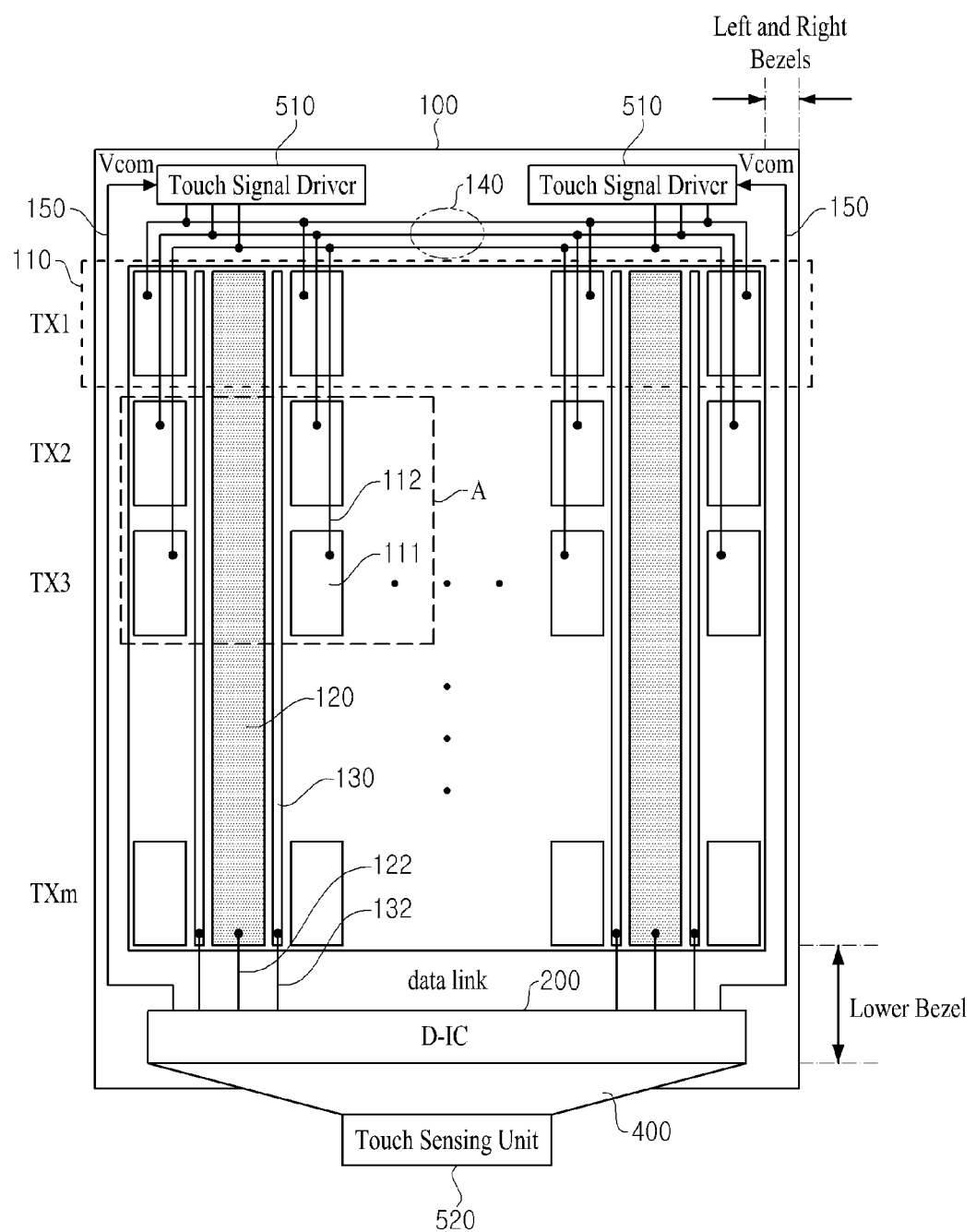
FIG. 4 is a diagram schematically illustrating a display device integrated with touch screen according to a second embodiment of the present invention.
Figure 5:
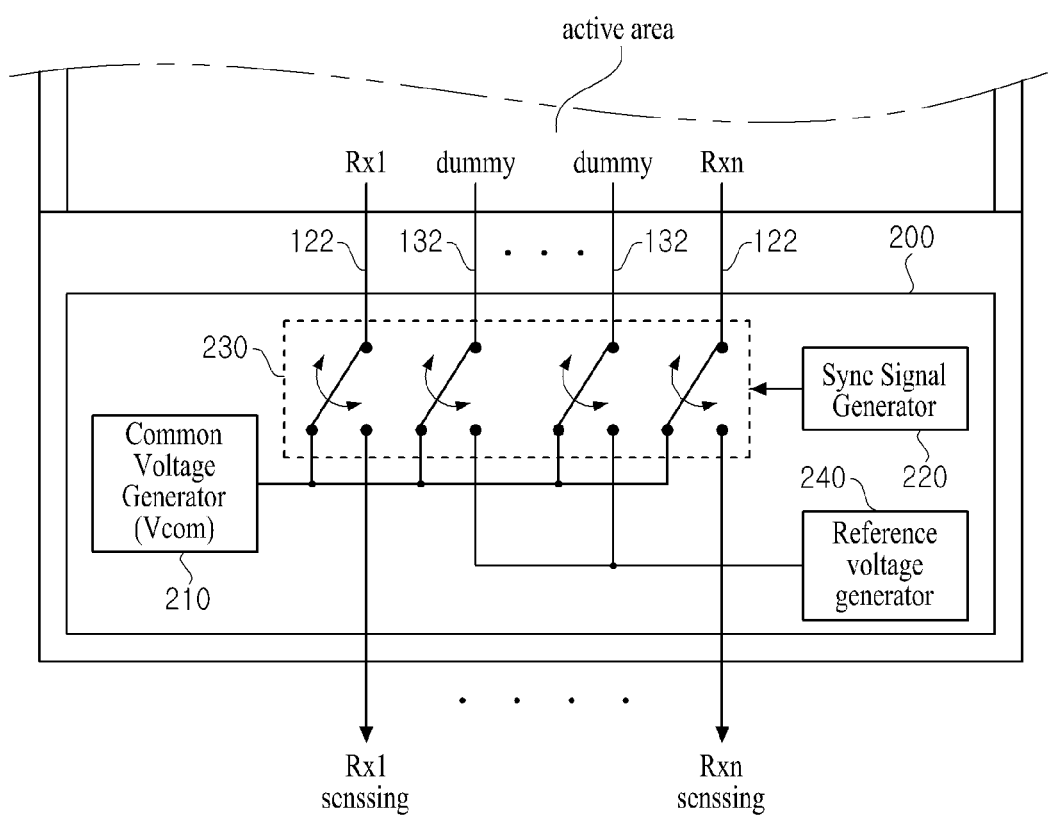
FIG. 5 is a diagram schematically illustrating a configuration of a display driver IC according to a second embodiment of the present invention.

FIG. 4 is a diagram schematically illustrating a display device integrated with touch screen according to a second embodiment of the present invention, and FIG. 5 is a diagram schematically illustrating a configuration of a display driver IC according to a second embodiment of the present invention.

In describing the display device integrated with touch screen according to the second embodiment of the present invention with reference to FIGS. 4 and 5, a detailed description on the same elements as the above-described first embodiment is not provided.

Referring to FIGS. 4 and 5, a plurality of common electrodes respectively formed at the plurality of pixels are divided into a plurality of touch driving electrodes 110 and a plurality of touch sensing electrodes 120.

The plurality of touch driving electrodes 110 may be configured with first to mth touch driving electrodes TX1 to TXm, and each of the touch driving electrodes 110 may be configured with n+1 number of sub driving electrodes 111. Also, the plurality of touch sensing electrodes 120 may be configured with first to nth touch sensing electrodes RX1 to RXn.

Dummy electrodes 130 are respectively formed at the left and right of each of the plurality of touch sensing electrodes 120. A dummy electrode line 132 is connected to each dummy electrode 130, and a common voltage (Vcom) or a voltage, having the same level as that of a reference voltage applied to a corresponding touch sensing electrode 120, is supplied to each dummy electrode 130 through a corresponding dummy line 132. When the driving mode is the display mode, the common voltage may be supplied to the dummy electrode 130, and when the driving mode is the touch mode, the reference voltage may be supplied to the dummy electrode 130. At this time, the common voltage may be supplied from the common voltage generator 210 of a display driver IC 200, and the reference voltage may be supplied from a reference voltage generator 240.

That is, when the driving mode is the display mode, the common voltage is supplied the dummy electrode 130 through a switching unit 230, and when the driving mode is the touch mode, the reference voltage may be supplied to the dummy electrode 130.

Each of the plurality of touch driving electrodes 110 includes a plurality of sub driving electrodes 111 due to an electrical connection in an inactive area.

Here, a transferor 310 of a touch driver is disposed in an upper inactive area of a touch screen panel 100. In order for the plurality of sub driving electrodes 111 to configure one touch driving electrode, a plurality of driving electrode lines 112 may be electrically connected through a corresponding common line 140 formed in the upper inactive area of the touch screen panel 100.

That is, the same touch driving signal should be supplied to the plurality of sub driving electrodes 111 configuring one touch driving electrode 110. Therefore, the driving electrode lines 112 of the respective sub driving electrodes 111 are electrically connected to each other through the common line 140 formed in the upper inactive area of the touch screen panel 100.

A touch signal driver 510, which generates a touch driving signal and supplies the touch driving signal to the touch driving electrode 110, is disposed in the upper inactive area of the touch screen panel 100. The touch signal driver 510 may be implemented as a type built into a lower substrate of the touch screen panel 100 identically or similarly to a gate-in panel (GIP) type. As another example, the touch signal driver 510 may be implemented as a type built into the lower substrate of the touch screen panel 100 identically or similarly to a chip-on glass (COG) type.

A touch sensing unit 520, which detects the presence of a user's touch and a touched position on the basis of a plurality of touch sensing signals from the touch sensing electrodes 120, may be disposed outside the touch screen panel 100. As another example, the touch sensing unit 520 may be disposed in a lower inactive area of the touch screen panel 100. In FIG. 4, as an example, it is illustrated that the touch sensing unit 520 is disposed outside the touch screen panel 100 and connected to the display driver IC 200 through an FPC 400.

That is, in the display device integrated with touch screen according to the second embodiment of the present invention, the touch signal driver 510 and the touch sensing unit 520 that perform a function of the existing touch IC may be separately provided. The touch signal driver 510 may be disposed in the upper inactive area of the touch screen panel 100, and the touch sensing unit 520 may be disposed in the outside or lower inactive area of the touch screen panel 100.

In other words, as illustrated in FIG. 4, in the display device integrated with touch screen according to the second embodiment of the present invention, the plurality of driving electrode lines 112 may be electrically connected to each other through a common voltage line 150 in the upper inactive area of the touch screen panel 100, and then may be connected to the touch signal driver 510.

The touch signal driver 510 supplies a touch driving signal (TX signal) to the plurality of touch driving electrodes 110 in the touch driving mode. In the display driving mode, the touch signal driver 510 supplies the common voltage (Vcom) to the plurality of touch driving electrodes 110. To this end, the common voltage line 150 is formed in each of left and right inactive areas of the touch screen panel 100, and connects the touch signal driver 510 and the display driver IC 200.

Figure 7:
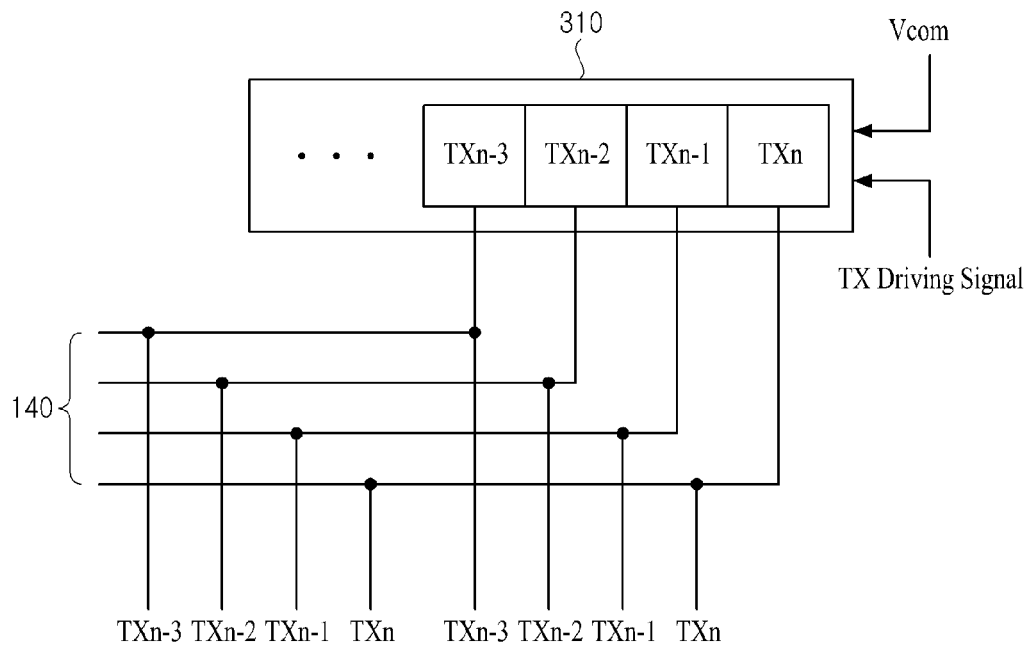
FIGS. 7 and 8 are diagrams illustrating a touch driving circuit unit of a display device integrated with touch screen according to an embodiment of the present invention.

The common voltage generated in the display driver IC 200, as illustrated in FIG. 7, is supplied to the touch signal driver 510 through the common voltage line 150.

Therefore, in the display device integrated with touch screen according to various embodiments of the present invention, a plurality of sub driving electrodes are electrically connected to each other not inside the touch screen panel 100 but in the inactive area of the touch screen panel 100 to configure one touch driving electrode, thus increasing an aperture ratio.

The display device integrated with touch screen according to various embodiments of the present invention, the driving electrode lines 112 of each touch driving electrode are not connected to a left side and right side of the touch screen panel 100, and the driving electrode line 112 extending from each of the plurality of sub driving electrodes 111 extends to the upper inactive area of the touch screen panel 100, thus decreasing left and right bezel widths of the touch screen panel 100.

Each of the plurality of touch driving electrodes 110 may be configured with a plurality of block-type common electrodes that are formed to overlap a plurality of unit pixel areas. Each of the plurality of touch sensing electrodes 120 may be configured with one block-type common electrode that is formed to overlap the plurality of unit pixel areas.

Referring to FIG. 5, the display driver IC 200 applies the common voltage to the touch screen (i.e., the touch driving electrodes 110 and the touch sensing electrodes 120) according to the driving mode of the touch screen panel 100.

When the driving mode of the touch screen panel 100 is the touch mode, the display driver IC 200 receives a plurality of touch sensing signals from the touch sensing electrodes 120 of the touch screen. At this time the touch signal driver 510 supplies the touch driving signal to the touch driving electrodes 110 of the touch screen.

To this end, the display driver IC 200 may include the common voltage generator 210, the sync signal generator 220, the switching unit 230, and the reference voltage generator 240.

The common voltage generator 210 generates the common voltage to be applied to the plurality of touch driving electrodes 110 or the plurality of touch sensing electrodes 120 which are included in the touch screen.

In other words, the plurality of touch driving electrodes 110 and the plurality of touch sensing electrodes 120 according to various embodiments of the present invention should perform a function of the common electrode. Therefore, the common voltage generator 210 generates the common voltage used to drive liquid crystal when the touch screen panel 100 operates in the display driving mode, and supplies the generated common voltage to the touch signal driver 510 and the plurality of touch sensing electrodes 120.

In the image output period in which the touch screen panel 100 operates in the display driving mode, the sync signal generator 220 generates a first sync signal that allows the plurality of touch driving electrodes 110 and the plurality of touch sensing electrodes 120 to be connected to the common voltage generator 210.

During the touch sensing period in which the touch screen panel 100 operates in the touch driving mode, the sync signal generator 220 generates a second sync signal that allows the plurality of touch sensing electrodes 120 to be connected to a receiver 320 of the touch driver.

In other words, during the image output period, the sync signal generator 220 outputs the first sync signal to the switching unit 230 to connect the plurality of touch sensing electrodes 120 and the plurality of dummy electrodes 130 to the common voltage generator 210. Also, in the image output period, the sync signal generator 220 outputs the first sync signal to the touch signal driver 510, thereby allowing the touch signal driver 510 to supply the common voltage to the plurality of touch driving electrodes 110.

During the touch sensing period, the sync signal generator 220 outputs the second sync signal to the switching unit 230 and the touch signal driver 510 disposed in the upper inactive area of the touch screen panel 100, and thus allows the plurality of touch driving electrodes 110 and the plurality of touch sensing electrodes 120 to operate as touch electrodes.

The switching unit 230 connects the plurality of touch driving electrodes 110 to the common voltage generator 210 or the touch sensing unit 520 according to the sync signal indicating the driving mode.

Moreover, the switching unit 230 connects the plurality of dummy electrodes 130 to the common voltage generator 210 or the reference voltage generator 240 according to the sync signal indicating the driving mode.

The reference voltage generator 240 generates the reference voltage supplied to the plurality of touch sensing electrodes 120, and when the driving mode is the touch mode, the reference voltage generator 240 supplies the generated reference voltage to the plurality of touch sensing electrodes 120. At this time, the reference voltage generator 240 supplies the reference voltage to the plurality of dummy electrodes 130 in addition to the plurality of touch sensing electrodes 120.

Figure 6:
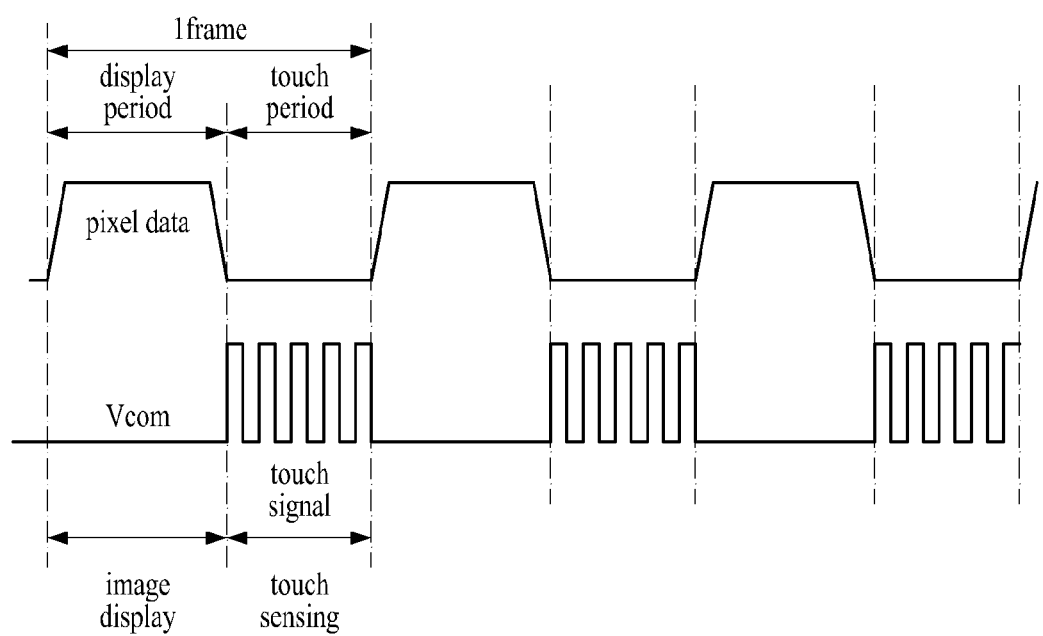
FIG. 6 is a diagram schematically illustrating a method of driving a display device integrated with touch screen according to embodiments of the present invention.

Referring to FIG. 6, one frame may be divided into a display period and a touch period such that an image is displayed and a touch driving is performed.

During the display period of one frame, a transmittance of light passing through a liquid crystal layer is adjusted according to data voltages applied to the respective pixel electrodes and the common voltage applied the common electrodes of the plurality of pixels, thereby displaying an image based on image signals.

For example, during the display period, image data (i.e., data voltages) are supplied to the plurality of data lines in units of one horizontal line according to a data enable signal (DE). Therefore, each of the data voltages is supplied to a corresponding pixel electrode when a corresponding TFT is turned on. Simultaneously, the common voltage (Vcom) is supplied the touch driving electrodes 110 and the touch sensing electrodes 120 which are the common electrodes.

During a non-display period, a capacitance change caused by a user's touch is sensed by using the touch driving electrodes 110 and the touch sensing electrodes 120 which are the common electrodes. Furthermore, the display device compares a touch capacitance based on the user's touch and a reference capacitance to detect a touched position.

For example, during the non-display period, the common electrode is used as the touch electrode, and the touch driving signal for sensing a touch is supplied to the touch electrode.

When the touch driving signal is supplied to the common electrode acting as the touch electrode, a capacitance generated at the touch electrode is changed by the user's touch. At this time, the receiver 320 of the touch IC compares the reference capacitance and the touch sensing signal (i.e., the capacitance generated at the touch electrode) applied through the sensing electrode line 122 to detect the presence of the user's touch and a touched position.

For example, the presence of the user's touch and the touched position may be detected during a reference signal (blank signal) period that differentiates a previous frame and a next frame. Detecting a position touched by the user may be started and ended on the basis of a vertical sync signal (V-Sync), and detecting the presence of a touch and a touched position may be performed during a vertical blank (V-blank) period that differentiates a previous frame and a next frame.

When the first sync signal indicating the display driving mode is input to the switching unit 230, the plurality of touch sensing electrodes 120 are connected to the common voltage generator 210. Therefore, the common voltage generated by the common voltage generator 210 is applied to the plurality of touch sensing electrodes 120 through the respective sensing electrode lines 122.

Moreover, when the first sync signal indicating the display driving mode is input to the switching unit 230, the plurality of dummy electrodes 130 are connected to the common voltage generator 210. Therefore, the common voltage generated by the common voltage generator 210 is applied to the plurality of dummy electrodes 130 through the respective dummy electrode lines 132.

When the common voltage is supplied to the transferor 310 through the common electrode line 150 and the first sync signal indicating the display driving mode is input to the transferor 310, the transferor 310 supplies the common voltage, which is input from the common voltage generator 210, to all the touch driving electrodes 110.

Figure 8:
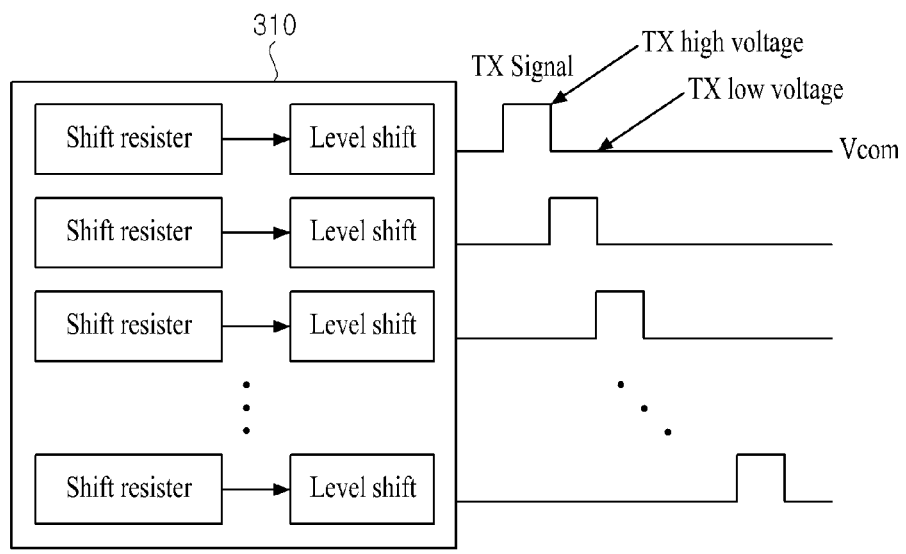

Referring to FIGS. 7 and 8, when the second sync signal indicating the touch driving mode is input to the touch signal driver 510, the touch signal driver 510 generates the touch driving signal of input TX1 to TXn.

The touch signal driver 510 applies the generated touch driving signal to the plurality of touch driving electrodes 110 through the respective driving electrode lines 112.

In this case, a high voltage of the touch driving signal is output as a certain voltage, and a low voltage of the touch driving signal is output at the same level as the common voltage (Vcom).

When the second sync signal indicating the touch driving mode is input to the switching unit 230, the touch sensing unit 520 is connected to the plurality of touch sensing electrodes 120, and receives a plurality of touch sensing signals from the plurality of sensing electrodes 120 through the respective sensing electrode lines 122.

Moreover, when the second sync signal indicating the touch driving mode is input to the switching unit 230, the reference voltage generator 240 is connected to the plurality of dummy electrodes 130, and supplies a reference voltage to the plurality of dummy electrodes 130 through the respective dummy electrode lines 132.

Here, the switching unit 230 includes a plurality of switches 232 that are connected to the plurality of touch sensing electrodes 120 and the plurality of dummy electrodes 130, and the plurality of switches 232 may be connected to the respective touch sensing electrodes 120 and the respective dummy electrodes 130.

The common voltage switching function is built into the display driver IC 200, and thus, the manufacturing cost can be reduced by using the touch IC 300. Also, by extending the plurality of driving electrode lines 112 to the upper inactive area of the touch screen panel 100, the left, right, and lower bezels of the touch screen panel 100 can be reduced.

Figure 9:
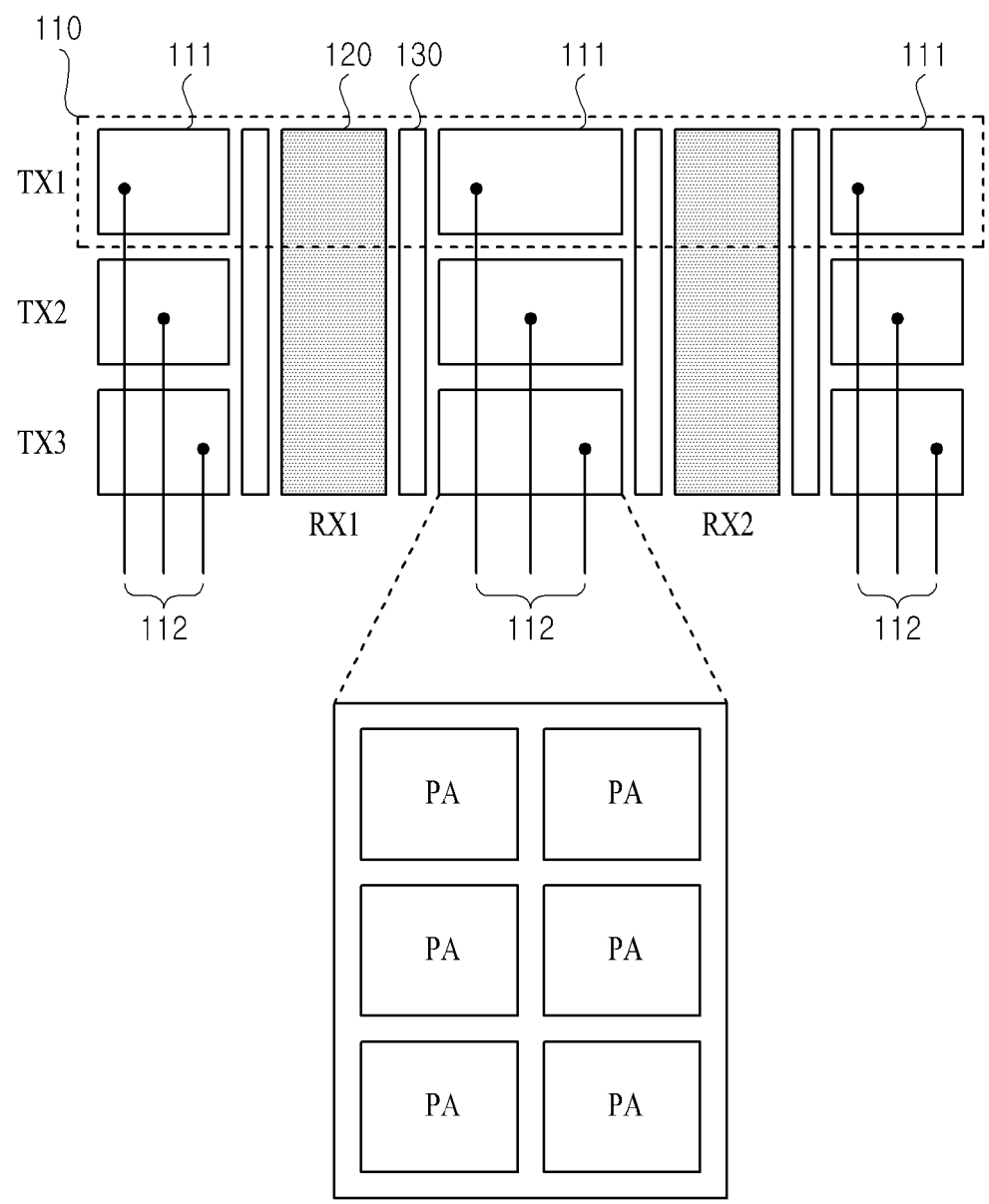
FIGS. 9 to 11 are diagrams illustrating a pixel structure of a display device integrated with touch screen according to an embodiment of the present invention.
Figure 10:
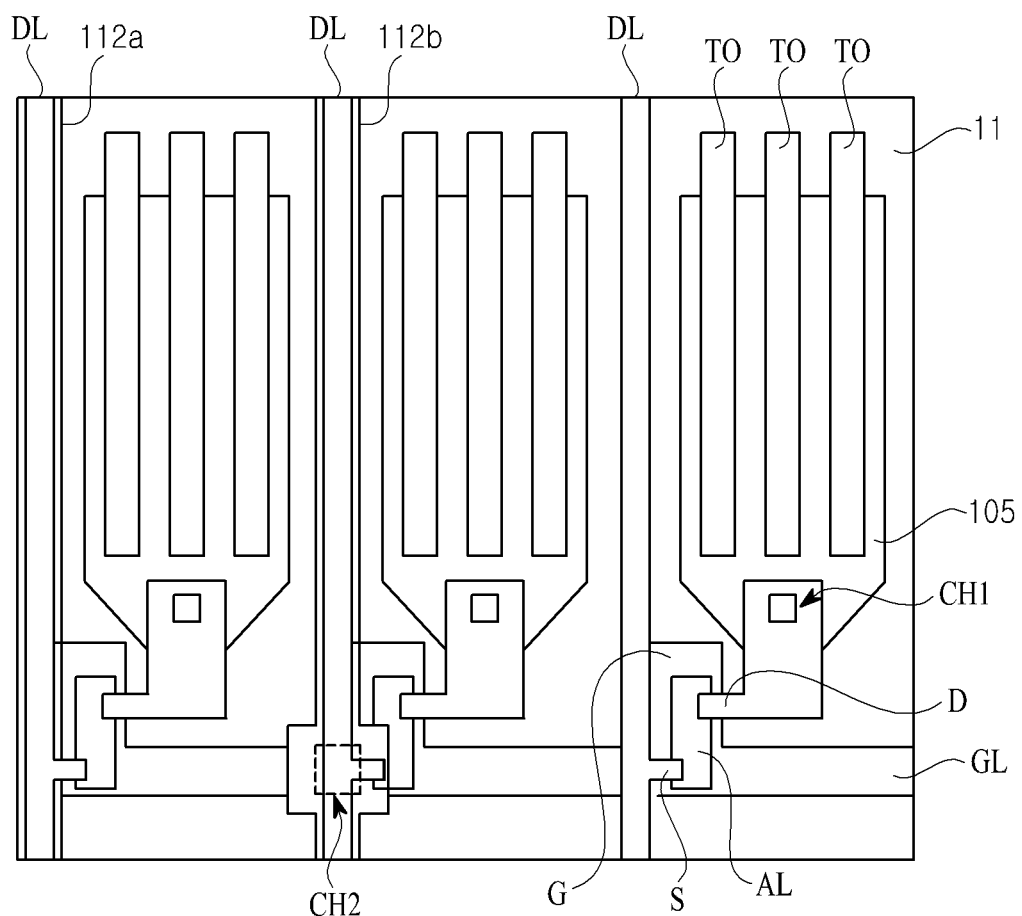
Figure 11:
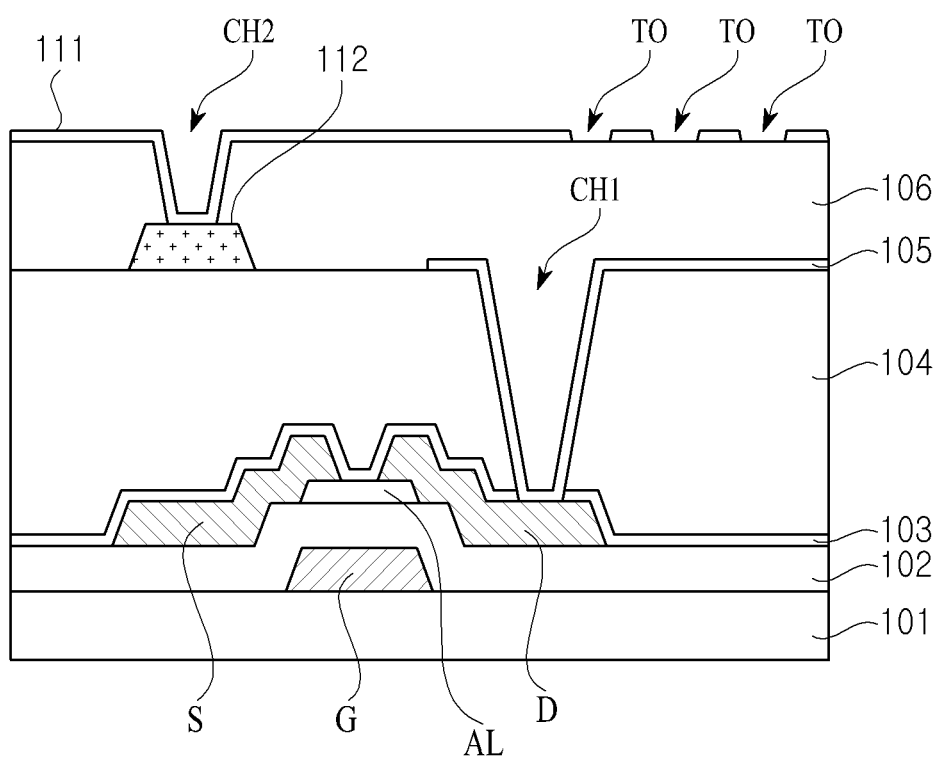

FIGS. 9 to 11 are diagrams illustrating a pixel structure of a display device integrated with touch screen according to an embodiment of the present invention. Hereinafter, a structure of the touch driving electrodes 110 and touch sensing electrodes 120 will be described in detail with reference to FIGS. 9 to 11. FIG. 9 illustrates an enlarged area A of FIGS. 2 to 4.

As illustrated in FIG. 9, each of the plurality of touch driving electrodes TX1 and TX2 includes the plurality sub driving electrodes 111, each of which overlaps six unit pixel areas PA. Also, each of the plurality of touch sensing electrodes RX may overlap twelve unit pixel areas. One unit pixel area may be composed of three sub pixels that display red, green, and blue colors.

Here, the touch sensing electrode RX is partially illustrated to overlap one unit pixel area, but may actually overlap two or more unit pixel areas.

Moreover, a size of each of the touch driving electrode and touch sensing electrode may be appropriately adjusted in consideration of a size of the unit pixel area and an area touched by a finger or the like, and thus the number of unit pixels corresponding to the touch driving electrode and the touch sensing electrode may be adjusted.

FIG. 10 illustrates a plane of a unit pixel for describing a connection relationship between a plurality of driving electrode lines 112a and 112b and the sub driving electrode 111 of the display device integrated with touch screen according to embodiments of the present invention illustrated in FIGS. 2 and 4.

Referring to FIG. 10, a plurality of pixel electrodes 105 are respectively formed in a plurality of areas defined by intersections between a plurality of gate lines GL and a plurality of data lines DL.

Each of a plurality of TFTs includes a gate electrode G extending from a corresponding gate line GL, a source electrode S extending from a corresponding data line DL, a drain electrode D connected to a corresponding pixel electrode 105 through a contact hole CH1, and an active layer AL disposed therebetween.

The sub driving electrode 111 that is the common electrode includes a plurality of slits TO that are long formed at certain intervals. Like this, when the plurality of slits TO are formed at the common electrode, a fringe field is generated between the pixel electrode 105 and the common electrode through the plurality of slits TO, and liquid crystal is driven in a fringe field switching (FFS) mode.

The plurality of driving electrode lines 112a and 112b may be formed in parallel with the data line DL, and may be electrically connected to the sub driving electrode 111 through a contact hole CH2.

In this case, the touch driving line connected to the sub driving electrode included in each touch driving electrode is not connected to the sub driving electrode included in the other touch driving electrode.

In FIG. 9, the driving electrode lines 112a and 112b are illustrated as being formed along the data line DL, but are not limited thereto.

In another embodiment of the present invention, the touch driving line may be formed from a position connected to the sub driving electrode 111. In other words, the touch driving line may be formed from the contact hole CH2 through which the sub driving electrode and the touch driving line are connected to each other.

Here, the unit pixel structure of the present invention has been described above with the unit pixel corresponding to the driving electrode as an example, but the unit pixel corresponding to the sensing electrode may be formed in a structure equal or similar to FIG. 11.

Therefore, at a position at which the touch sensing electrode 120 and the touch sensing line 122 are connected to each other, the touch driving electrode and the touch driving line in FIG. 10 may be connected to each other through the contact hole CH2 identically or similarly thereto.

FIG. 11 is a cross-sectional view of a sub pixel area for describing a connection relationship between the driving electrode line 112 and the sub driving electrode 111 of the display device integrated with touch screen according to an embodiment of the present invention.

For example, as illustrated in FIG. 11, the gate electrode G, the active layer AL, the source electrode S, the drain electrode D, the pixel electrode 105, the driving electrode line 112, and the sub driving electrode 111 (the common electrode) are formed on a base substrate 101 in the lower substrate of the touch screen panel 100. A gate insulating layer 102, a buffer PAS 103, a PAC 104, and a PAS 106 are stacked for insulating the layers. Also, the sub driving electrode 111 that is the common electrode includes the plurality of slits TO that are long formed at certain intervals.

Here, the drain electrode D is connected to the pixel electrode 105 through the contact hole CH1 formed in the PAS 103 and the PAC 104. Also, the driving electrode line 112 may be formed of a metal layer that is connected to the sub driving electrode 111 through the contact hole CH2, and may be formed on the same layer as the pixel electrode 105.

When the touch driving line 112 connected to the sub driving electrode 111 included in one touch driving electrode is not connected to a lower end of the sub driving electrode included in the other touch driving electrode, the touch driving line 112 is insulated from the other driving electrode line and the other sub driving electrode by an insulating material such as the PAS 106, and thus, the touch driving line 112 does not contact the other driving electrode line and the other sub driving electrode.

In order for the sub driving electrode 111 to be connected to the driving electrode line 112, the sub driving electrode 111 may be connected to the driving electrode line 112 through the contact hole CH2 formed at the PAS 106.

In the display device integrated with touch screen according to the embodiments of the present invention, the left and right bezels are reduced, thus increasing an aesthetic design.

In the display device integrated with touch screen according to the embodiments of the present invention, the lower bezel is reduced, thus increasing an aesthetic design.

In the display device integrated with touch screen according to the embodiments of the present invention, the driving circuit that generates the touch driving signal is built into the touch screen panel, thus decreasing the size of the touch IC and the manufacturing cost.

The display device integrated with touch screen according to the embodiments of the present invention has an enhanced touch sensing performance without a reduction in display quality.

In addition to the aforesaid features and effects of the present invention, other features and effects of the present invention can be newly construed from the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device integrated with touch screen, the display device comprising:
a touch screen panel configured to include a plurality of touch driving electrodes, each comprising a plurality of sub driving electrodes that are electrically connected to each other to configure one touch driving electrode and being disposed in parallel and in a gate line direction of the panel, and a plurality of touch sensing electrodes that are each disposed between a plurality of adjacent sub driving electrodes and are formed in parallel and in a data line direction of the panel;
a touch signal driver provided in a first inactive area at one side of the panel, and configured to supply a touch driving signal or a common voltage to the plurality of touch driving electrodes according to a driving mode;
a display driver IC provided in a second inactive area at another side of the panel opposite the one side of the panel, and configured to receive a plurality of touch sensing signals from the plurality of touch sensing electrodes and to supply the common voltage to the touch signal driver and the plurality of touch sensing electrodes according to the driving mode;
a touch sensing circuit configured to determine whether there is a touch, on a basis of the plurality of touch sensing signals;
a plurality of sensing electrode lines that extend from the respective touch sensing electrodes in the data line direction;
a plurality of common voltage lines configured to supply the common voltage, supplied by the display driver IC, to the touch signal driver;
a plurality of common lines electrically connected to at least a corresponding one of the touch driving electrodes; and
a plurality of driving electrode lines, at least one of the driving electrode lines including a first electrode to connect to a corresponding one of the sub driving electrodes of the corresponding one of the touch driving electrodes and a second electrode to connect to at least a corresponding one of the common lines such that the corresponding one of the touch driving electrodes electrically connects to the corresponding one of the common lines, wherein the display driver IC is configured to generate a reference voltage and apply the reference voltage to the plurality of touch sensing electrodes according to the driving mode to sense a touch, wherein the plurality of sensing electrode lines are connected to the display driver IC in the second inactive area of the panel without overlapping with the plurality of common lines, wherein one of the common voltage lines extends from the second inactive area to the first inactive area through a third inactive area without overlapping with the common lines and the sensing electrode lines, and another of the common voltage lines extends from the second inactive area to the first inactive area through a fourth inactive area of the panel without overlapping with the common lines and the sensing electrode lines, the one and the another of the common voltage lines connecting the display driver IC to the touch signal driver, wherein each of the plurality of driving electrode lines extends from the corresponding one of the common lines in parallel with the data line direction without overlapping with the touch sensing electrodes, and overlaps with the corresponding one of the touch driving electrodes, and wherein each of the common lines is disposed in the first inactive area, and is connected to the touch signal driver and to at least a corresponding one of the driving electrode lines.

2. The display device of claim 1, wherein each of the plurality of driving electrode lines is electrically connected to the touch signal driver in the first inactive area of the panel through the corresponding one of the common lines.

3. The display device of claim 2, wherein each of the plurality of driving electrode lines is formed of a metal layer connected to the corresponding one of the sub driving electrodes through a contact hole in an active area of the panel, and is formed to overlap a corresponding data line with an insulating layer therebetween.

4. The display device of claim 1, wherein,
each of the plurality of touch driving electrodes comprises a plurality of block-type common electrodes formed to overlap a plurality of unit pixel areas, and
each of the plurality of touch sensing electrodes comprises one block-type common electrode formed to overlap a plurality of unit pixel areas.

5. The display device of claim 1, wherein the display driver IC further comprises:
a common voltage generator configured to generate the common voltage; and
a switching circuit configured to connect the plurality of touch sensing electrodes through the plurality of sensing electrode lines to the common voltage generator or to the touch sensing circuit according to a sync signal indicating the driving mode.

6. The display device of claim 5, wherein the switching circuit comprises a plurality of switches respectively connected to the plurality of touch sensing electrodes through the respective sensing electrode lines, the plurality of switches being connected to the plurality of touch sensing electrodes in one-to-one correspondence relationship.

7. The display device of claim 5, wherein,
when the sync signal is a first sync signal indicating a display driving mode of the panel, the switching circuit connects the plurality of touch sensing electrodes to the common voltage generator, and when the sync signal is a second sync signal indicating a touch driving mode of the panel, the switching circuit connects the plurality of touch sensing electrodes to a receiver of the touch signal driver.

8. The display device of claim 7, wherein the display driver IC further comprises a sync signal generator configured to generate the sync signal.

9. The display device of claim 1, further comprising a plurality of dummy electrodes formed in parallel between the plurality of touch sensing electrodes,
wherein the display driver IC comprises a reference voltage generator configured to supply the common voltage or the reference voltage to the plurality of dummy electrodes according to the driving mode.

10. The display of claim 1, wherein the corresponding one of the common lines is configured to transmit the touch signal or the common voltage from the touch signal driver to only the corresponding one of the touch driving electrodes.

11. The display device of claim 9, wherein,
when the sync signal is a first sync signal indicating a display driving mode of the panel, the common voltage is supplied the dummy electrode, and
when the sync signal is a second sync signal indicating a touch driving mode of the panel, the reference voltage is supplied to the dummy electrode.

12. The display device of claim 3, wherein each of the plurality of driving electrode lines has the one end at the contact hole through which the corresponding sub driving electrode and the driving electrode line are connected to each other.

13. The display device of claim 1, wherein each of the plurality of driving electrode lines is formed between the corresponding one of the common lines and a position connected to the sub driving electrode.

14. The display device of claim 1, wherein driving electrode lines respectively connected to the plurality of sub driving electrodes configuring the one touch driving electrode are formed of the same length to each other.

15. The display device of claim 9, wherein the plurality of dummy electrodes are connected to the display driver IC in the second inactive area of the panel respectively through a plurality of dummy electrode lines extending to the second inactive area.

16. The display device of claim 1, wherein the touch screen panel has an active area, and the first and the second inactive areas are disposed adjacent opposite sides of the active area so that the active area is disposed between the first and the second inactive areas, and
wherein the touch sensing circuit s disposed in or connected to the second inactive area of the panel.

17. A display device integrated with touch screen, the display device comprising:
a touch screen panel configured to include a plurality of touch driving electrodes, each comprising a plurality of sub driving electrodes that are electrically connected to each other to configure one touch driving electrode and being disposed in parallel and in a gate line direction of the panel, and a plurality of touch sensing electrodes that are each disposed between a plurality of adjacent sub driving electrodes and are formed in parallel and in a data line direction of the panel;
a touch signal driver provided in a first inactive area at one side of the panel, and configured to supply a touch driving signal or a common voltage to the plurality of touch driving electrodes according to a driving mode;

a display driver IC provided in a second inactive area at another side of the panel opposite the one side of the panel, and configured to receive a plurality of touch sensing signals from the plurality of touch sensing electrodes and to supply the common voltage to the touch signal driver and the plurality of touch sensing electrodes according to the driving mode;

a touch sensing circuit configured to determine whether there is a touch, on a basis of the plurality of touch sensing signals;

a plurality of sensing electrode lines that extend from the respective touch sensing electrodes in the data line direction;

a plurality of common voltage lines configured to supply the common voltage, supplied by the display driver IC, to the touch signal driver;

a plurality of common lines electrically connected to at least a corresponding one of the touch driving electrodes; and a plurality of driving electrode lines, at least one of the driving electrode lines including a first electrode to connect to a corresponding one of the sub driving electrodes of the corresponding one of the touch driving electrodes and a second electrode to connect to at least a corresponding one of the common lines such that the corresponding one of the touch driving electrodes electrically connects to the corresponding one of the common lines, wherein the display driver IC is configured to generate a reference voltage and apply the reference voltage to the plurality of touch sensing electrodes according to the driving mode to sense a touch, wherein the touch sensing circuit is disposed outside the panel and is connected to the display driver IC in the second inactive area through a flexible printed circuit, wherein the plurality of sensing electrode lines are connected to the display driver IC in the second inactive area of the panel without overlapping with the plurality of common lines, wherein one of the common voltage lines extends from the second inactive area to the first inactive area through a third inactive area without overlapping with the common lines and the sensing electrode lines, and another of the common voltage lines extends from the second inactive area to the first inactive area through a fourth inactive area of the panel without overlapping with the common lines and the sensing electrode lines, the one and the another of the common voltage lines connecting the display driver IC to the touch signal driver, wherein each of the plurality of driving electrode lines extends from the corresponding one of the common lines in parallel with the data line direction without overlapping with the touch sensing electrodes, and overlaps with the corresponding one of the touch driving electrodes, and wherein each of the common lines is disposed in the first inactive area, and is connected to the touch signal driver and to at least a corresponding one of the driving electrode lines.

18. A display device integrated with touch screen, the display device comprising:

a touch screen panel configured to include a plurality of touch driving electrodes, each comprising a plurality of sub driving electrodes that are electrically connected to each other to configure one touch driving electrode and being disposed in parallel and in a gate line direction of the panel, and a plurality of touch sensing electrodes that are each disposed between a plurality of adjacent sub driving electrodes and are formed in parallel and in a data line direction of the panel;

a touch signal driver provided in a first inactive area at one side of the panel, and configured to supply a touch driving signal or a common voltage to the plurality of touch driving electrodes according to a driving mode;

a display driver IC provided in or connected to a second inactive area at another side of the panel opposite the one side of the panel, and configured to receive a plurality of touch sensing signals from the plurality of touch sensing electrodes and to supply the common voltage to the touch signal driver and the plurality of touch sensing electrodes according to the driving mode;

a touch sensing circuit configured to determine whether there is a touch, on a basis of the plurality of touch sensing signals;

a plurality of sensing electrode lines that extend from the respective touch sensing electrodes in the data line direction;

a plurality of common voltage lines configured to supply the common voltage, supplied by the display driver IC, to the touch signal driver;

a plurality of common lines electrically connected to at least a corresponding one of the touch driving electrodes; and a plurality of driving electrode lines, at least one of the driving electrode lines including a first electrode to connect to a corresponding one of the sub driving electrodes of the corresponding one of the touch driving electrodes and a second electrode to connect to at least a corresponding one of the common lines such that the corresponding one of the touch driving electrodes electrically connects to the corresponding one of the common lines, wherein the display driver IC is configured to generate a reference voltage and apply the reference voltage to the plurality of touch sensing electrodes according to the driving mode to sense a touch, wherein at least one of the driving electrode lines overlaps with a sub driving electrode adjacent to the corresponding one of the sub driving electrodes in the data line direction without being electrically connected to the adjacent sub driving electrode, wherein the plurality of sensing electrode lines are connected to the display driver IC in the second inactive area of the panel without overlapping with the plurality of common lines, wherein one of the common voltage lines extends from the second inactive area to the first inactive area through a third inactive area without overlapping with the common lines and the sensing electrode lines, and another of the common voltage lines extends from the second inactive area to the first inactive area through a fourth inactive area of the panel without overlapping with the common lines and the sensing electrode lines, the one and the another of the common voltage lines connecting the display driver IC to the touch signal driver, wherein each of the plurality of driving electrode lines extends from the corresponding one of the common lines in parallel with the data line direction without overlapping with the touch sensing electrodes, and overlaps with the corresponding one of the touch driving electrodes, and wherein each of the common lines is disposed in the first inactive area, and is connected to the touch signal driver and to at least a corresponding one of the driving electrode lines.

19. The display device of claim 1, wherein the touch signal driver is configured to receive a sync signal indicating the driving mode, and to supply the touch driving signal or the common voltage to the touch driving electrodes based on the sync signal.

20. The display device of claim 1, wherein the touch screen panel has an active area between the first and the second inactive areas, and wherein each of the common lines is disposed in the first inactive area between the touch signal driver and the active area, and extends in parallel with the gate line direction of the panel.

* * * * *